United States Patent
Reimann et al.

(10) Patent No.: US 12,140,533 B2
(45) Date of Patent: Nov. 12, 2024

(54) METHOD FOR EVALUATING SPECTRA OF BIOLOGICAL SUBSTANCES OF ANIMAL ORIGIN, VEGETABLE ORIGIN OR A MIXTURE THEREOF

(71) Applicant: Evonik Operations GmbH, Essen (DE)

(72) Inventors: Ingolf Reimann, Reinheim (DE); Ansgar Jaeger, Mainhausen (DE); Joachim Reising, Kleinostheim (DE); Andrea Stier, Grossostheim (DE); Anne Lotz, Altenstadt (DE)

(73) Assignee: Evonik Operations GmbH, Essen (DE)

( * ) Notice: Subject to any disclaimer, the term of this patent is extended or adjusted under 35 U.S.C. 154(b) by 179 days.

(21) Appl. No.: 17/758,994

(22) PCT Filed: Jan. 22, 2021

(86) PCT No.: PCT/EP2021/051459
§ 371 (c)(1),
(2) Date: Jul. 18, 2022

(87) PCT Pub. No.: WO2021/148606
PCT Pub. Date: Jul. 29, 2021

(65) Prior Publication Data
US 2023/0030479 A1    Feb. 2, 2023

(30) Foreign Application Priority Data

Jan. 22, 2020  (EP) .................................. 20153031

(51) Int. Cl.
| | |
|---|---|
| *G01N 21/31* | (2006.01) |
| *G01J 3/02* | (2006.01) |
| *G01J 3/28* | (2006.01) |
| *G01N 21/01* | (2006.01) |

(52) U.S. Cl.
CPC ............ *G01N 21/31* (2013.01); *G01J 3/0264* (2013.01); *G01J 3/28* (2013.01); *G01N 2021/0118* (2013.01); *G01N 2201/0221* (2013.01)

(58) Field of Classification Search
CPC ............ G01N 21/31; G01N 2021/0118; G01J 3/0264
See application file for complete search history.

(56) References Cited

U.S. PATENT DOCUMENTS

| | | | |
|---|---|---|---|
| 9,562,848 B2 * | 2/2017 | Goldring | G01N 21/255 |
| 2004/0119972 A1 | 6/2004 | Smit-Kingma et al. | |
| 2008/0137087 A1 | 6/2008 | Greten et al. | |
| 2009/0321648 A1 | 12/2009 | Shelley et al. | |
| 2015/0021478 A1 | 1/2015 | Lee et al. | |
| 2019/0257692 A1 * | 8/2019 | Cochran | G06T 3/073 |

FOREIGN PATENT DOCUMENTS

| | | |
|---|---|---|
| CN | 208420696 U | 1/2019 |
| EP | 3 361 248 A1 | 8/2018 |
| WO | WO 2019/215206 A1 | 11/2019 |

OTHER PUBLICATIONS

International Search Report & Written Opinion issued Apr. 7, 2021 in PCT/EP2021/051459, filed on Jan. 22, 2021, 24 pages.
Extended European Search Report issued Jul. 2, 2020 in European Application 20153031.8, filed on Jan. 22, 2020, 11 pages.

* cited by examiner

*Primary Examiner* — Maurice C Smith
(74) *Attorney, Agent, or Firm* — Oblon, McClelland, Maier & Neustadt, L.L.P.

(57) ABSTRACT

A method for evaluating spectra of a biological substance of animal and/or vegetable origin, may include (a) detecting a spectrometer in a network formed of at least one spectrometer and an input/output device, (b) requesting the individual status of each spectrometer in the network of (a), and displaying the detected spectrometers and their status on the input/output device, the status reflecting if a spectrometer is available for recording a spectrum or not, (c) receiving a selection from the spectrometers being available for recording a spectrum on the input/output device, (d) recording a spectrum of a sample material of animal origin, vegetable origin or a mixture thereof on the spectrometer selected in (c), (e) predicting a value for at least one parameter from the spectrum of (d) by a calibration function and/or calibration graph suitable for predicting the parameter value, and (e) displaying the result from (e) on the input/output device.

13 Claims, No Drawings

METHOD FOR EVALUATING SPECTRA OF BIOLOGICAL SUBSTANCES OF ANIMAL ORIGIN, VEGETABLE ORIGIN OR A MIXTURE THEREOF

CROSS-REFERENCE TO RELATED APPLICATIONS

The present application is the national stage of international application PCT/EP2021/051459, filed on Jan. 22, 2021, and claims the benefit of the filing date of European Appl. No. 20 153 03 1.8, filed on Jan. 22, 2020.

The present invention is on the field of spectrometry and relates to a method for evaluating spectra of biological substances of animal origin, vegetable origin or a mixture, and a system for evaluating such spectra.

Spectrometry is a very useful tool for obtaining relevant information on sample materials. In particular, spectrometry such as infrared spectrometry in combination with chemometrics and calibration functions or calibration graphs is able to provide information on the basis of predictions and approximations, which are otherwise only accessible through classical quantitative analyses, which are very cost and time consuming. However, untrained and unexperienced staff are struggling with the chemometric prediction of parameters by means of spectrometry. This also applies to the performance of the prediction of parameters by means of spectrometry and the evaluation or interpretation of the thus obtained information. These problems are even stronger when it comes to spectra of a biological substance of animal origin, of vegetable origin or a mixture thereof.

The Chinese utility model CN 208420696 U discloses an online system for wheat infection scab grade, specifically the detection of mycotoxin, based on near infrared spectrometry. The practical use of this system is therefore extremely limited.

Hence, there was a need for a method suitable for untrained staff for making predictions of parameters of interest from spectra and for evaluating spectra. According to the present invention this problem is solved in that the spectra of sample materials are recorded on spectrometers, at least one parameter value is predicted from said spectra by means of at least one calibration function and/or calibration graph suitable for predicting the respective parameter and the thus obtained result is displayed on an input/output device.

One object of the present invention is therefore a method for evaluating spectra of a biological substance of animal origin, vegetable origin or a mixture thereof, comprising the steps of a) detecting a spectrometer in a network formed of at least one spectrometer and an input/output device, b) requesting the individual status of each spectrometer in the network of step a), and displaying the detected spectrometers and their status on the input/output device, wherein the status reflects if a spectrometer is available for recording a spectrum or not, c) receiving a selection from the spectrometers being available for recording a spectrum on the input/output device, d) recording a spectrum of a sample material of animal origin, vegetable origin or a mixture thereof on the spectrometer selected in step c), e) predicting a value for at least one parameter from the spectrum of step d) by means of at least one calibration function and/or calibration graph suitable for predicting the value of said parameter, wherein the at least one parameter is selected from the group consisting of the content of at least one amino acid, the crude protein content, the ammonia content, the content of the total amino acids with ammonia, the content of the total amino acids without ammonia, the crude fat content, the dry matter content, the crude ash content, the energy content, the content of at least one biogenic amine, the content of at least one antinutritional factor, the content of at least one sugar, the starch content, the crude fiber content, the neutral detergent fiber content, the acid detergent fiber content, the total phosphorous content, the phytate phosphorous content, the reactive lysine content, the total lysine content, the ratio of reactive lysine content to total lysine content, the protein dispersibility index, the protein solubility, the trypsin inhibitor activity, the urease activity, and the proceeding conditions indicator (PCI), and f) displaying the result from the prediction of step e) on the input/output device.

In principle, the method according to the present invention is not subject to any limitations regarding a specific spectrometer. Therefore, any conceivable type of spectrometer can be used in the method according to the present invention, for example, an infrared spectrometer, a Raman spectrometer, a UV-Vis spectrometer, or even a combination of said spectrometers provided it is suitable for recording spectra of the sample material subjected to the method. It is also possible to use an infrared spectrometer and a Raman spectrometer and a UV-Vis spectrometer in combination, which gives the user the widest range of applications for all possible sample materials that are suitable for spectrometry in general. Nevertheless, it is preferred that the spectrometer of the method according to the present invention is an infrared spectrometer, in particular a near infrared (NIR) spectrometer, because of its broad range of possible applications. In that case the infrared spectra, in particular near infrared spectra, are evaluated with the method according to the present invention.

Depending on the spectrometer used, the near-infrared (NIR) spectrum of step d) can be recorded at wavelengths between 400 and 2,500 nm with any suitable infrared spectrometer working either on the monochromator principle or on the Fourier transform principle. Preferably, the NIR spectra are recorded between 1,000 and 2,500 nm. Wavelengths are easily converted into the respective wavenumbers and therefore, the NIR spectra can of course also be recorded at the corresponding wavenumbers. When the material of the sample material of step d) is not translucent, the reflectance of the emitted light from the sample is measured and the difference between the emitted light and the reflected light is given as absorption. Therefore, the NIR spectrometer can work either in the transmission mode or in the reflectance mode.

It is further preferred that the spectrometers in the method according to the present invention are portable spectrometers, for example a portable infrared spectrometer, such as a portable NIR spectrometer, e.g. a handheld infrared spectrometer, which gives the user the option to perform the method according to the present invention at any conceivable place of interest.

In principle, the input/output device of the method according to the present invention is not subject to any limitations and can therefore be any conceivable input/output device that can receive input from a user, a spectrometer, or a device at the periphery of the system and display any conceivable result as output. For example, the input/output device can be a computer, such as a desktop computer, a network computer, a thin client, or a portable computer, e.g. a laptop or a notebook, a tablet or a smartphone. Nevertheless, it is preferred that the input/output device is a portable input/output device, e.g. a portable computer, a tablet or a smartphone, preferably a tablet or smartphone, which gives the user the option to perform the method according to the present invention at any conceivable place of interest.

Therefore, the method according to the present invention is preferably a computer-implemented method.

It is therefore also preferred that the spectrometer is a portable spectrometer and the input/output device is a portable device. It is further preferred that each spectrometer in step a) is a portable spectrometer and the input/output device is a portable device.

The method according to the present invention is not subject to any limitations regarding the number of spectrometers in the network formed with an input/output device of step a). Therefore, the number of spectrometers is at the user's discretion and can range from 1 to any conceivable number of spectrometers, e.g. from 1 to 100, from 1 to 90, from 1 to 80, from 1 to 70, from 1 to 60, from 1 to 50, from 1 to 40, from 1 to 30, from 1 to 20, or from 1 to 10. From an administrative and logistic perspective, the number of spectrometers is kept at a reasonable number, preferably between 1 and 10.

According to the present invention, the at least one parameter determined in step e) of the method is selected from the group consisting of the content of at least one amino acid, i.e. one or more amino acids, the crude protein content, the ammonia content, the content of the total amino acids with ammonia, the content of the total amino acids without ammonia, the crude fat content, the dry matter content, the crude ash content, the energy content, the content of at least one biogenic amine, i.e. one or more biogenic amines, the content of at least one antinutritional factor, the content of at least one sugar, the starch content, the crude fiber content, the neutral detergent fiber content, the acid detergent fiber content, the total phosphorous content, the phytate phosphorous content, the reactive lysine content, the total lysine content, the ratio of reactive lysine content to total lysine content, the protein dispersibility index, the protein solubility, the trypsin inhibitor activity, the urease activity, and the proceeding conditions indicator (PCI).

The at least one amino acid, i.e. one or more amino acids, is preferably at least one essential amino acid and/or at least one non-essential amino acid. The at least one essential amino acid is selected from the group consisting of methionine, cysteine, cystine, the sum of methionine and cystine, lysine, arginine, isoleucine, threonine, tryptophan, leucine, valine, histidine, phenylalanine, and/or any derivative and/or salt thereof. The sum of methionine and cystine is synonym to the sum of the methionine content and the cystine content in the sample. The at least one non-essential amino acid is selected from the group consisting of glycine, serine, alanine, aspartic acid, glutamic acid, proline, and/or any derivative and/or salt thereof. Preferably, the at least one amino acid comprises all of the mentioned essential amino acids and/or all of the mentioned non-essential amino acids.

In the context of the present invention the term ammonia content in particular relates to the free ammonia content, i.e. ammonia that is not bound or coordinated, found in samples after sample preparation. The presence of said ammonia may have different reasons. For example, it may result from the hydrolysis of urea, or it may result from the addition of an ammonium compound to the material being subjected to the method.

In the context of the present invention the term the content of the total amino acids with ammonia is used to denote the sum of the content of all amino acids in the material sample minus the ammonia content in the material sample, i.e. the difference between the content of all amino acids and the ammonia content in the material sample.

In the context of the present invention the term the content of the total amino acids with ammonia is used to denote the sum of the content of all amino acids in the material sample plus the ammonia content in the material sample, i.e. the sum of the total amino acids content and the ammonia content in the material sample.

Hence, the determination and the prediction of the content of the total amino acids with or without ammonia always involves the determination or prediction of the total amino acids content in the material sample and the determination or prediction of the ammonia content in said material sample. Depending on the individual materials being subjected to the method according to the present invention, a high ammonia content can be indicative for a faked product. For example, if a feedstuff or feedstuff raw material was blended with urea, this would raise the value for the crude protein content, whose determination is based on the determination of the nitrogen. For example, soy beans or soy bean products typically have a low ammonia content, and here, a high value for the ammonia content would indicate a manipulated or faked product. On the other side, wheat typically has a high content of glutamine, which during typical procedures for its determination is transformed to glutamic acid with release of ammonia at the same time. Here, a high ammonia content is nothing to worry about.

In the context of the present invention the term crude protein is used as known to the person skilled in the art of animal feeding. Typically, it considers all sources of nitrogen.

In the context of the present invention the term crude fat is used as known to the person skilled in the art of animal feeding and refers to the crude mixture of fat-soluble material present in a sample. Crude fat also known as the ether extract or the free lipid content, is the traditional measure of fat in feed or feed products.

In the context of the present invention the term dry matter, often also referred to as dry weight, is used as known to the person skilled in the art of animal feeding and denotes a measurement of the mass of something when completely dried. The dry matter of vegetable and animal material consists of all its constituents excluding water.

In the context of the present invention the term crude ash is used as known to the person skilled in the art of animal feeding and denotes the content of inorganic materials, such as minerals, in feeds.

The energy content is preferably the gross energy (GE), the apparent metabolizable energy (AME), in particular the apparent metabolizable energy corrected to zero nitrogen retention (AMEn), the digestible energy (DE), in particular the digestible energy for sows (DE_S) and/or growing pigs (DE_GP), the metabolizable energy (ME), in particular the metabolizable energy for sows (ME_S) and/or growing pigs (ME_GP), and/or the net energy (NE), in particular the net energy for sows (NE_S) and/or growing pigs (NE_GP).

In the context of the present invention the term gross energy (GE), often also referred to as heat of combustion, is used as known to the person skilled in the art of animal feeding and denotes the energy released by burning a sample of feed in excess oxygen in an adiabatic bomb calorimeter. In the context of the present invention the gross energy of a processed feedstuff raw material and/or feedstuff is therefore preferably measured in an adiabatic bomb calorimeter. The amount of gross energy depends exclusively on the chemical composition of the feed but chemical composition cannot predict the energetic transformation efficiency. Gross energy as such does not take into account any losses of energy during ingestion, digestion and metabolism of feed. In fact, 1 kg of starch has about the same gross energy value as 1 kg of straw even though most of the energy in the straw cannot be used by pigs or poultry because of missing digestive enzymes. Gross energy (GE) can be determined as follows:

$$GE[MJ/kg\ DM]=(4143+56\times\times EE[\%])+(15\times CP\ [\%])-(44\times ASH[\%]))\times 0.0041868,$$

with
 DM=dry matter,
 EE=ether extract,
 CP=crude protein,
 ASH=crude ash.

In the context of the present invention the term digestible energy (DE) is used as known to the person skilled in the art of animal feeding and denotes the gross energy of feed minus the gross energy of feces, i.e. the difference between the gross energy of feed and the gross energy of feces. This energy system takes into account the digestibility of feed and gives a useful measure of the energy the animal may be able to use. The advantage of digestible energy is that it is easy to determine. The disadvantage however is that it does not take into account losses of energy in urine and as combustible gases and during metabolism. These losses vary among feedstuffs.

The digestible energy for growing pigs (DE_GP) can be determined as follows:

$$DE\_GP[MJ/kg\ DM]32\ (4168-(91\times ASH[\%\ DM])+(19\times CP[\%\ DM])+(39\times EE[\%\ DM])-(36\times NDF[\%\ DM]))\times 0.0041868,$$

with
 ASH=crude ash,
 CP=crude protein,
 DM=dry matter,
 EE=ether extract,
 NDF=neutral detergent fiber.

The digestible energy for sows (DE_S) can be determined as follows:

$$DE\_S[MJ/kg\ DM]=1.041\times DE\_GP[MJ/kg\ DM]+0.0066\times CF[g/kg\ DM],$$

or $$DE\_S[MJ/kg\ DM]=1.041\times((4168-(91\times ASH[\%\ DM])+(19\times CP[\%\ DM])+(39\times EE[\%\ DM])-(36\times NDF[\%\ DM]))\times 0.0041868)+0.066\times CF[\%\ DM]$$

with
 DE_GP=digestible energy of growing pigs,
 ASH=crude ash,
 CP=crude protein,
 DM=dry matter,
 EE=ether extract,
 NDF=neutral detergent fiber,
 CF=crude fiber.

In the context of the present invention the term metabolizable energy (ME) is used as known to the person skilled in the art of animal feeding and denotes the digestible energy minus energy excreted in urine and as combustible gases, i.e. the difference between the digestible energy and the energy excreted in urine and as combustible gases. By taking into account these losses, metabolizable energy gives a better estimate of the energy being available to the animal. Metabolizable energy corrects the digestible energy for some of the effects of quality and quantity of protein.

The metabolizable energy for growing pigs (ME_GP) can be determined as follows:

$$ME\_GP[MJ/kg\ DM]=(4194-(92\times ASH[\%\ DM])+(10\times CP[\%\ DM])+(41\times EE[\%\ DM])-(35\times NDF[\%\ DM]))\times 0.0041868$$

with
 ASH=crude ash,
 CP=crude protein,
 DM=dry matter,
 EE=ether extract,
 NDF=neutral detergent fiber.

The metabolizable energy for sows (ME_S) can be determined as follows:

$$ME\_S[MJ/kg\ DM]=-3.96+(1.17\times ME\_GP[MJ/kg\ DM]+(0.132\times NDF\ [\%\ DM])$$

or $$ME\_S[MJ/kg\ DM]=-3.96+(1.17\times((4194-(92\times ASH[\%\ DM])+(10\times CP[\%\ DM])+(41\times EE[\%\ DM])-(35\times NDF[\%\ DM]))\times 0.0041868)+(0.132\times NDF[\%\ DM])$$

with
 ME_GP=metabolizable energy for growing pigs,
 ASH=crude ash,
 CP=crude protein,
 DM=dry matter,
 EE=ether extract,
 NDF=neutral detergent fiber.

In the context of the present invention the term net energy (NE) is used as known to the person skilled in the art of animal feeding and denotes the metabolizable energy minus the heat increment, which is the heat produced (and thus energy used) during digestion of feed, metabolism of nutrients and excretion of waste, i.e. the difference between the metabolizable energy and the heat increment, which is the heat produced (and thus energy used) during digestion of feed, metabolism of nutrients and excretion of waste. The energy left after these losses is the energy actually used for maintenance and for production, i.e. growth, gestation, lactation. Net energy is the only system that describes the energy that is actually used by the animal. Therefore, net energy is the most accurate and equitable way to date of characterizing the energy content of feed. However, net energy is much more difficult to determine and more complex than digestible energy and metabolizable energy.

The net energy for growing pigs (NE_GP) can be determined as follows:

$$NE\_GP[MJ/kg\ DM]=(2875+(43.8\times EE[\%\ DM])+(6.7\times ST[\%\ DM])-(55.9\times ASH[\%\ DM])-(20.1\times(NDF[\%\ DM]-ADF[\%\ DM]))-(40.2\times NDF[\%\ DM]))\times 0.0041868$$

with
 ASH=crude ash,
 ADF=acid detergent fiber,
 DM=dry matter,
 EE=ether extract,
 NDF=neutral detergent fiber,
 ST=starch.

The net energy for sows (NE_S) can be determined as follows:

$$NE\_S[MJ/kg\ DM]=(0.703\times(DE\_S[MJ/kg\ DM])\times 0.0041868+(15.8\times EE[\%\ DM])+(4.7\times ST[\%\ DM])-(9.7\times CP[\%\ DM])+(9.8\times CF[\%\ DM]))\times 0.0041868$$

or $$NE\_S[MJ/kg\ DM]=(0.703 \times ((((4168-(91 \times ASH[\% DM])+(19 \times CP[\% DM])+(39 \times EE[\% DM])-(36 \times NDF[\% DM])) \times 0.0041868 \times 1.014)+(0.066 \times CF[\% DM]))/0.0041868)+(15.8 \times EE[\% DM])+ (4.7 \times ST[\% DM])-(9.7\ CP[\% DM])-(9.8 \times CF[\% DM])) \times 0.0041868$$

with
ASH=crude ash,
ADF=acid detergent fiber,
CF=crude fiber,
CP=crude protein,
DE_S=digestible energy for sows,
DM=dry matter,
EE=ether extract,
NDF=neutral detergent fiber,
ST=starch.

In the context of the present invention the term apparent metabolizable energy is used as known to the person skilled in the art of animal feeding and denotes the metabolizable energy, which considers the amount of nitrogen which has been used to build up body protein and which is therefore treated as if it had been excreted as uric acid. The values for the apparent metabolizable energy of poultry thus refer to values corrected to zero nitrogen retention (AMEn). Depending on the raw material different equations for the calculation of AMEn are applied. This general formula is applied for the raw material given in the formula below:

$$AMEn[MJ/kg\ DM]=(factor\ DM \times DM[\%]+factor\ ASH \times ASH[\% DM]+factor\ CP \times CP[\% DM]+ factor\ EE \times EE[\% DM]+factor\ CF \times CF[\% DM]+ factor\ NFE \times NFE[\% DM]+factor\ ST \times ST[\% DM]+factor\ SU \times SU[\% DM])/100$$

with
ASH=crude ash,
CF=crude fiber,
CP=crude protein,
DM=dry matter,
EE=ether extract,
NFE=nitrogen-free extract,
ST=starch,
SU=sugar.
DM[%]=100 as all data is used according to 100% dry matter standardization.

In the context of the present invention the term biogenic amine is used as known to the person skilled in the art of animal feeding and denotes a biogenic substance with one or more amine groups, i.e. an organic base with low molecular weight, which is produced by microbial, vegetable and animal metabolisms. In feed, food and beverages they are formed by the enzymes of raw material or are generated by microbial decarboxylation of amino acids.

The at least one biogenic amine is preferably tryptamine, 5-hydroxy-tryptamine, 1,7-diaminoheptane, phenylethylamine, histamine, putrescine, spermine, spermidine, agmatine, tyramine, octopamine, cadaverine and/or any derivative and/or salt thereof. The mention of any specific biogenic amine relates to its presence and/or to its content in the sample in question.

The at least one antinutritional factor is preferably a trypsin inhibitor, a glucosinolate, gossypol, and/or any derivatives and/or salts thereof. Antinutritional factors result from the secondary metabolism of plants and are present only in particular plant species. They perform no essential functions in the primary metabolism. Rather, their function is the defense of varmints and pests, the regulation and function as dying stuffs and fragrances. The negative effects of anti-nutritional factors on the animal consist in the feed-uptake, a reduced animal performance, a change in digestibility of the nutrients, and metabolic disorders. Although antinutritional factors may have quite severe effects on animals, they are not considered toxic. Mycotoxin is therefore not an antinutritional factor in the context of the present invention.

In the context of the present invention the term sugar is used as generally known in the art and denotes the generic term for soluble carbohydrates. The term sugar comprises simple sugars, also called monosaccharides, including glucose, fructose, and galactose, and compound sugars, also disaccharides or double sugars, which are compounds composed of two monosaccharides joined by a glycosidic bond, e.g. sucrose (composed of glucose and fructose), lactose (composed of glucose and galactose), and maltose (composed of two molecules of glucose) and which are hydrolyzed into simple sugars in the body. Sugars, in particular the aforementioned simple sugars and compound sugars, are found in fruits and vegetable, in particular in so-called sugar plants such as sugarcane, sugar beet, sugar palm, sugar maple, sweet sorghum, silver date palm, jubaea, palmyra palm, and agaves.

In the context of the present invention the term starch, also referred to as amylum, is used as generally known in the art and denotes a polymeric carbohydrate consisting of numerous glucose units joined by glucosidic bonds. It is produced by most green plants as energy storage. Large amounts are in potatoes, maize (corn), rice, wheat and cassava (manioc).

In the context of the present invention the term crude fiber is used as known to the person skilled in the art of animal feeding and denotes a measurement of fiber content. Also known as Weende cellulose, crude fiber is the insoluble residue of an acid hydrolysis followed by an alkaline one. This residue contains true cellulose and insoluble lignin. It is also used to assess hair, hoof or feather residues in animal by-products. Even though the more accurate Van Soest analysis has superseded it since the 1970s, the analysis of crude fiber remains common in feed laboratories.

In the context of the present invention the term acid detergent fiber (ADF) is used as known to the person skilled in the art of animal feeding and denotes a measurement of the amount of structural substances, specifically cell wall structural substances, such as cellulose, lignin and lignin-N-compounds. Acid detergent fiber is the insoluble residue after treatment with an acidic detergent solution.

In the context of the present invention the term neutral detergent fiber (NDF) is used as known to the person skilled in the art of animal feeding and denotes a measurement of the amount of structural substances, specifically cell wall structural substances, such as cellulose, hemicellulose, lignin and lignin-N-compounds. Neutral detergent fiber is the insoluble residue after treatment with a neutral detergent solution.

In the context of the present invention the term phytate phosphorous is used as known to the person skilled in the art and denotes the phosphorous content in phytic acid. Phytic acid belongs to the group of bioactive substances. It has a significant nutritional role as the principal storage form of phosphorous in many plant tissues, especially bran and seeds. It is also present in many legumes, cereals, and grains. Phytic acid and phytate have a strong binding affinity to the dietary minerals, calcium, iron, and zinc, inhibiting their absorption. Phytic acid and phytate have a particular relevance for ruminants because they are the only mammals, which can break down phytic acid and consume the thus accumulated phosphate. The bacteria in their stomach produce the enzyme phytase, which facilitates the breakdown of phytate to sugar and phosphate.

Typically, feedstuffs and/or feedstuff raw materials are subjected to a so-called processing in order to remove anti-nutritional factors or to reduce at least their amount in the feedstuffs and/or feedstuff raw materials. In said processing, the feedstuffs and/or feedstuff raw materials are subjected to a heat treatment, such as cooking or toasting, which leads to the removal or at last partial removal of amongst others proteinase inhibitors and lectins, or to a treatment with alkali, which leads to the removal or at least partial removal of sinapin. However, the processing can also lead to damages of the amino acids being present in the feedstuff or feedstuff raw materials. For example, compounds with an amino group such as amino acids and protein, are subjected to the Maillard reaction in the presence of reducing compounds, in particular reducing sugars. This is in particular the case for lysine with an E-amino group, which can react with a multitude of ingredients in feedstuffs or feedstuff raw materials.

The processing of feedstuffs and feedstuff raw materials also has an effect on proteins, such as urease and trypsin, and the solubility of proteins in alkali and the solubility of proteins in water, the latter also referred to as the protein dispersibility index (PDI).

A processing, which leads to damages on feedstuff raw materials and/or feedstuff and in particular to decreased amounts/contents of an amino acid, is referred to as over-processing. By comparison, a processing, which does not give a complete or at least acceptable removal of anti-nutritional factors from feedstuff raw materials and/or feedstuffs, is referred to as under-processing. Finally, a processing, which leads to a complete or at least acceptable removal of anti-nutritional factors without a damage to an amino acid and/or protein, is referred to as adequate processing or correct processing.

In the context of the present invention the term the reactive lysine content is used to denote the content of lysine, which is actually available for the animal, in particular for the digestion in the animal.

By comparison, the term the total lysine content is used in the context of the present invention to denote the sum of the lysine content, which is actually available for the animal, in particular for the digestion in the animal, and of the lysine content, which is not available for the animal, in particular not for the digestion in the animal. The latter lysine content (not available for the animal) is typically due to degradation reactions of lysine, such as the Maillard rection.

The processing of feedstuffs and feedstuff raw materials also has an effect on the solubility of proteins in alkali. The solubility of proteins in alkali comprises the determination of the percentage of proteins that is solubilized in an alkali solution. The solubility of proteins in alkali is an effective measure to distinguish over-processed material from correctly processed material, e.g. according to DIN EN ISO 14244.

The determination of the protein dispersibility index (PDI) measures the solubility of proteins in water after blending a sample with water, e.g. according to AOCS Ba 10-65.

The determination of trypsin inhibitor activity is based on the ability of the inhibitors in question to form a complex with the enzyme trypsin, and thus reducing its activity. This analysis can be done according to the methods of ISO 14902 (2001) and AACC 22.40-01.

The enzyme urease catalyzes the degradation of urea to ammonia and carbon dioxide. Since urease naturally occurs in soybeans, the urease activity is a very useful measure to evaluate the quality of processed soybeans. The quantitative analysis of the urease activity can be done according to the methods of ISO 5506 (1988) or AOCS Ba 9-58.

In the context of the present invention the term processing conditions indicator (PCI) is used as disclosed in EP 3361248 A1. The PCI is especially relevant for processed feedstuffs and feedstuff raw materials, as explained above. The PCI of a feedstuff and/or feedstuff raw material is generated by obtaining a set of parameters which are complementary in their significance and thus are combinable. These parameters are amongst others the trypsin inhibitor activity, the urease activity, the protein solubility in alkali, the protein dispersibility index, and/or the ratio of the reactive lysine content to the total lysine content. A further parameter is at least one amino acid selected from the group consisting of methionine, cysteine, cystine, threonine, leucine, arginine, isoleucine, valine, histidine, phenylalanine, tyrosine, tryptophan, glycine, serine, proline, alanine, aspartic acid and glutamic acid. These parameters are obtained by quantitative analysis of a sample series of a feedstuff material from different time points of processing of the specific feedstuff and/or feedstuff raw material. For each of the determined parameters the so-called processing conditions indicator (PCI) is determined, which describes all conceivable processing conditions of a feedstuff and/or feedstuff raw material, i.e. under-, adequate- or over-processing. The term adequate processing is equal to correct processing. The thus obtained processing conditions indicator can then be plotted into a scale, to facilitate the categorization of a feedstuff raw material and/or feedstuff as under-, adequately- or over-processed.

Preferably, the method according to the present invention makes a prediction of the identity of the sample material of step d) from the spectrum recorded in step d). For making this prediction, the method analysis the similarity of the sample material of step d) with a population of spectra of known materials in a database DB1.

In an embodiment of the method according to the present invention, the step d) further comprises the step of
 d1) predicting the identity of the sample material of step d) from the spectrum recorded in step d) by means of a similarity analysis using a database DB1 of spectra of known materials.

In principle, the method according to the present invention is not subject to any limitations regarding a specific procedure for the similarity analysis, provided the respective similarity analysis used allows for prediction of the material identity with the highest possible reliability or at least with an acceptable accuracy. For example, the similarity analysis in step d1) can be performed according to the following procedure:
 d1a) transforming absorption intensities of wavelengths or wavenumbers in a spectrum of step d) to give a query vector,
 d1b) providing a database DB1 with a set of database vectors of spectra of known materials,
 d1c) analyzing the similarity between the query vector of step d1a) and the set of database vectors of step d1 b) comprising the steps of
  d1c1) calculating a similarity measure and/or a distance measure between each database vector of step d1 b) and the query vector of step d1a) to give a similarity value for each database vector with the query vector, d1c2) ranking the similarity values obtained in step d1c1) in descending order, when the similarity measure is calculated in step d1d), or in ascending order, when the distance measure is calculated in step d1d), wherein the top-ranked database vector has the greatest similarity with the query vector, d1c3) counting the number of occurrences of a material class among the top-ranked database vectors in the ranking obtained in step d1c2), wherein said number of occurrences is indicated by the variable N, d1c4) weighting the first N similarity values of a material class according to their position in the ranking obtained in step d1c2) to give weighted rank positions of the material class, d1c5) forming the sum of the weighted rank positions obtained in step d1c4) for the material class to give scores of the material class, wherein the highest score indicates the greatest similarity to the sample material of step d), and d1d) assigning the material class of the database vector with the greatest similarity to the sample material of step d).

The sample material subjected to step d) is preferably feedstuff, feedstuff raw material, such as soy, soybeans, preferably full-fat soybeans, and/or soybean products, preferably soybean meal and soybean cake/expellers, maize, meal leftover, slaughterhouse waste, feather meal, and/or bone meal. The same applies to the known material whose spectra are in the database DB1 for the similarity analysis of step d1).

In order to avoid or at least significantly reduce the danger of an erroneous prediction of the identity of the sample material, the method preferably receives the confirmation or the non-confirmation of the predicted identity of the sample material from the user on the input/output device. When the user does not confirm the predicted identity of the sample material, the method receives the input of the identity of the sample material from the user on the input/output device.

In a preferred embodiment of the method according to the present invention the step d) further comprises the steps of d2a) displaying the predicted identity of the sample material obtained in step d1) on the input/output device, and d2b) receiving i) the confirmation of the predicted identity displayed in step d2a) or ii) the non-confirmation of the predicted identify displayed in step d2a) and the input of the identity of the sample material on the input/output device.

After receipt of the confirmation of the predicted identity of the sample material or the input of the identity of the sample material, the method according to the present invention can proceed further to predict a value of at least one parameter. Either the at least one parameter whose value(s) is/are predicted was input by the user or the method according to the present invention pulls one or more parameters whose value(s) is/are predicted in step e) for the material whose identity was predicted in step d1), confirmed in step d2b) or input in step d2b) from a database DB2. The latter option is preferred since it illustrates in the best way the benefits of the autonomous working of the method according to the present invention. Deposited in the database DB2 are the relevant parameters for each conceivable material, i.e. those parameters for which values can be predicted in the method according to the present invention.

In another embodiment of the method according to the present invention the step d) further comprises the step of d3a) pulling one or more parameters whose value(s) is/are predicted in step e) for the material whose identity was predicted in step d1), confirmed in step d2b) or input in step d2b) from a database DB2.

In this embodiment step d) of the method according to the present invention then comprises the following steps d1) predicting the identity of the sample material of step d) from the spectrum recorded in step d) by means of a similarity analysis using a database DB1 of spectra of known material, d2a) displaying the predicted identity of the sample material obtained in step d1) on the input/output device, d2b) receiving i) the confirmation of the predicted identity displayed in step d2a) or ii) the non-confirmation of the predicted identify displayed in step d2a) and the input of the identity of the sample material on the input/output device, and d3a) pulling one or more parameters whose value(s) is/are predicted in step e) for the material whose identity was predicted in step d1), confirmed in step d2b) or input in step d2b) from a database DB2.

Preferably, step d1) of this embodiment further comprises the steps d1a) to d1d) above.

In an alternative it is also possible that the method according to the present invention skips the steps d2a) and d2b) and proceeds with step d3). This option is used when the identity of the sample material is predicted in step d1) with a sufficient degree of likelihood. A sufficient degree of likelihood is preferably when the identity of the sample material of step d) was predicted with a likelihood of more than 50%, with a likelihood of at least 55, 60, 65, 70, 75, 80, 85, 90, 95 or even with a likelihood of 100%.

In an alternative preferred embodiment of the method according to the present invention the step d) further comprises the step d2') proceeding with step d3a), when the identity of the sample material is predicted in step d1) with a likelihood of more than 50%.

In this alternative embodiment step d) of the method according to the present invention then comprises the following steps d1) predicting the identity of the sample material of step d) from the spectrum recorded in step d) by means of a similarity analysis using a database DB1 of spectra of known material, d2') proceeding with step d3a), when the identity of the sample material is predicted in step d1) with a likelihood of more than 50%, and d3a) pulling one or more parameters whose value(s) is/are predicted in step e) for the material whose identity was predicted in step d1).

Preferably, step d1) of this alternative embodiment further comprises the steps d1a) to d1d) above.

Preferably, each conceivable material is mentioned in the database DB2 together with one or more parameters which are significant for the material in question. For example, if the method according to the present invention shall be applied to feedstuff and/or feedstuff raw materials, the materials in question are for example soybean, and maize, and then the relevant parameters for these materials would comprise the content in amino acids, preferably of all naturally occurring amino acids, the content of digestible amino acids and the content in crude protein.

In a preferred embodiment of the method according to the present invention the database DB2 contains info which parameters are significant for the material in question, so that only the one or more parameters being significant for the respective material are pulled from the database DB2 in step d3a).

After having pulled the one or more parameters from the database, the method according to the present invention can then go on to display the said one or more parameters as a suggestion to the user, who can select the one or more parameter whose value(s) is/are predicted from the displayed parameters.

In another preferred embodiment of the method according to the present invention the step d) further comprises the step of d3b) displaying the one or more parameters obtained from step d3a) on the input/output device, and d3c) receiving a selection from the parameters displayed in step d3b).

According to the present invention, a spectrum of a sample material is recorded in step d). Preferably, at least one spectrum, in particular, from 1 to 10, from 3 to 10, from 3 to 9, from 3 to 8, from 3 to 7, from 3 to 6, from 3 to 5, e.g. 3, 4 or 5 spectra are recorded in step d). A multiple recording of spectra of a sample material helps to reduce measuring inaccuracies or effects of an erroneous measuring in step d). When the step d) is a multiple recording of spectra, there are two options how to handle the thus obtained spectra and how to transform the multitude of spectra into one single spectrum. The first option is to form a centroid of the spectra recorded in step d) and to subject the thus obtained centroid to step e). The second option is to predict the value of the at least one parameter in step e) from each spectrum recorded in step d) and to form the mean of the thus obtained predicted values of said at least one parameter, wherein said mean may be then displayed as result in step f).

In a further embodiment of the method according to the present invention the step d) is a multiple recording of spectra, further comprising i) forming the centroid of all spectra recorded in step d) and subjecting the thus obtained centroid to step e) or ii) predicting the values for the at least one parameter from each spectrum of step d), and forming the mean value for the at least one parameter.

In mathematics and physics the term centroid, when used in context with a plane figure, denotes the arithmetic mean position of all points in the figure; and therefore, it is also referred to as geometric center of said figure. Hence, it is also the point at which a cutout of the shape could be perfectly balanced on the tip of a pin. When the figure is extended to an object in a multidimensional space, the term centroid denotes the mean position of all points of said object in all coordinate directions. In the context of the present invention, the term centroid therefore denotes the arithmetic mean position of all points of the spectra in all coordinate directions.

According to the present invention at least one parameter is predicted from a spectrum in step e). For this purpose, the respective calibration equation and/or calibration graph for the prediction of the parameter in question in a specific material is/are pulled from a database DB3. Next, the value of the at least one parameter matching to the absorptions in the spectrum/spectra or to the centroid of step d) is read off from the calibration graph of step e1.1) and/or the value of the at least one parameter matching to the absorptions in the spectrum/spectra or to the centroid of step d) are inserted into the calibration equation of step e1.1) to obtain the value for the at least one parameter. The thus obtained predicted value of the at least one parameter is then displayed as result in step f). The calibration equation and/or the calibration graph for each parameter of a material are generated in preceding steps by correlating the individual absorptions and their intensities in a spectrum, in particular near infrared absorptions obtained for a sample material, with the corresponding values of the same parameter from the quantitative analysis of the same material. The thus obtained correlation of the values obtained from the quantitative analysis with the absorptions and their intensities obtained from the spectroscopic measurement, e.g. near infrared spectroscopy, is then depicted or plotted as a calibration graph, which facilitates the matching of the absorption intensities of the spectroscopic measurement, e.g. near infrared spectroscopy, of other samples with the corresponding exact values for the parameters in question based on the quantitative analysis. The calibration equation and/or the calibration graph for the prediction of the processing conditions indicator (PCI) is preferably generated according to the technical teaching of EP 3361248 A1, in particular according to claim 3 and/or 4 of EP 3361248 A1. The calibration equations and/or calibration graphs for the prediction of the trypsin inhibitor activity, urease activity, protein solubility in alkali, protein dispersibility index, the reactive lysine content, the total lysine content, the ratio of the reactive lysine content to the total lysine content, and the content of at least one amino acid are preferably generated according to the technical teaching of EP 3361248 A1, in particular according to claim 3 of EP 3361248 A1. The calibration equation and/or the calibration graph for the prediction of the energy content is preferably generated according to the technical teaching of WO 2019/215206 A1, in particular according to claim 8 and/or 9 of WO 2019/215206 A1.

When the parameter whose value(s) is/are determined in step e) is the content of a specific ingredient or component, the calibration is made to weight percent (wt.-%).

In another embodiment of the method according to the present invention the step e) further comprises the steps of e1.1) pulling a calibration graph and/or calibration equation for the prediction of the value of the at least one parameter from a database DB3, e1.2) reading off the value of the at least one parameter matching to the absorptions in the spectrum/spectra or the centroid of step d) from the calibration graph of step e1.1) and/or inserting the absorption intensities at the respective wavelengths or wavenumbers in the spectrum/spectra or the centroid of step d) into the calibration equation of step e1.1.) to obtain the value for the at least one parameter, and e1.3) displaying the value for the at least one parameter obtained in step e1.2) as result in step f).

Preferably, the database DB3 contains the calibration graphs and/or calibration equations for the prediction of the value of all parameters according to the method according to the present invention, i.e. those mentioned in step e), for all materials of animal origin, vegetable origin or a mixture thereof to be subjected to said method.

The prediction of the conditions indicator (PCI) is preferably done according to the technical teaching of EP 3361248 A1, in particular according to claim 5 of EP 3361248 A1.

The prediction of an energy content, in particular of the gross energy (GE), the apparent metabolizable energy (AME), in particular the apparent metabolizable energy corrected to zero nitrogen retention (AMEn), the digestible energy (DE), in particular the digestible energy for sows (DE_S) and/or growing pigs (DE_GP), the metabolizable energy (ME), in particular the metabolizable energy for sows (ME_S) and/or growing pigs (ME_GP), and/or the net energy (NE), in particular the net energy for sows (NE_S)

and/or growing pigs (NE_GP) is preferably done according to the technical teaching of WO 2019/215206 A1, in particular according to any of claims 10, 11, 12, and/or 13 of WO 2019/215206 A1.

The method according to the present invention also allows to evaluate the sample material in question by comparing the predicted value for a parameter with the corresponding expected value for said parameter. The prediction of a value of at least one parameter by means of spectroscopy gives many valuable information, which otherwise are only accessible through classical quantitative analysis, which however is rather cost and time consuming. Trained staff is in principle capable of using the thus provided information in the best possible way. However, the evaluation of the predicted value of a variety of parameters is a challenge even for trained staff. This challenge is, of course, significantly higher for untrained staff, which may already struggle with the sheer amount of information from the predictions. Therefore, they need information on the sample material, which is simple to understand and give them clear instruction what to do. Preferably, the method according to the present invention therefore also gives the user a qualitative evaluation of a value predicted for the at least one parameter for the sample material. This evaluation is made relative to the expected value for the parameter in question.

In yet a further embodiment of the method according to the present invention the step e) further comprises the step of
- e2) evaluating the value predicted for the at least one parameter comprising the steps of
  - e2.1) pulling the expected value for the parameter of the sample material of step d) from a database DB4,
  - e2.2) evaluating the sample material of step d) as bad if the predicted value is at least a defined percentage lower than the expected value or as good if the predicted value is at least a defined percentage of the expected value, and
  - e2.3) displaying the evaluation obtained in step e2.2) as result in step f).

Preferably, the term at least a defined percentage lower than the expected value means 10, 15, 20, 25, 30, 35, 40, 45, 50, 60, 70 or 90 %, preferably more than 50, at least 55, 60, 65, 70, 75, 80, 85 or 90%, lower than the expected value in the context of the present invention. Preferably, the term at least a defined percentage of the expected value means at least 50, 55, 60, 65, 70, 75, 80, 85 or 90% of the expected value in the context of the present invention. Preferably, the said defined percentage for the lower threshold, i.e. evaluating the sample material as bad, as well as the said defined percentage for the higher threshold, i.e. evaluating the sample material as good, are set by the user or supervisor depending on the individual conditions given at the individual settings, locations, seasons etc. for each parameter of each individual material to be subjected to the method.

The expected value for each parameter of a sample material is preferably provided in a database DB4. Said database DB4 may be different from the database DB2 or may be identical with the database DB2. Basis for the database DB4 is a population of spectra of all materials being for the specific field in which the method according to the present invention shall be applied. Each of these spectra has been analyzed for the absorption maximum of each of the parameters whose values can be predicted from the spectra. Preferably, the parameters, which are significant for the material in question and particularly useful for the user, are considered. In the case that several parameters are significant for the material in question, the database DB4 contains a ranking of these significant parameters and/or a type of knock out criteria, which may be individually deposited in the database DB4 for each material. For example, a specific threshold value for the ammonia content can be knock out criteria for soy, or a specific threshold value for an antinutritional factor may be a knock out criteria.

Specifically, the database DB4 is therefore preferably updated with the expected values of parameters for sample materials of vegetable origin every season or every harvest. When material of vegetable origin from around the world is subjected to the method according to the present invention, the database DB4 is therefore preferably updated with the expected values of parameters for sample materials of vegetable origin every season or every harvest from all growing areas worldwide of the material in question.

Preferably, the method according to the present invention pulls details on the storage location and/or further processing of one or more materials of the same or essentially the same identity as the sample material of step d) and/or having the same or essentially the same value for the at least one parameter as the sample material of step d) from a database DB4. This allows to give specific recommendations on the user regarding the storage and/or further processing of the material whose sample was subject to the method according to the present invention. Such recommendations are particularly useful in agriculture, specifically in the field of animal nutrition, e.g. in the preparation of feedstuff. Here, the user needs to know the most suitable place for storing the recently delivered or obtained feedstuff or feedstuff raw material. Preferably, the recently delivered or obtained material and the material, to which the material mentioned first is added, should have the most similarities in common, because this gives a material of uniform characteristics, which provides the best possible benefit.

In another embodiment of the method according to the present invention the step 0 further comprises the step
- f1) giving a recommendation on storage and/or further processing of the material whose sample was subjected to step d), comprising the steps of
  - f1.1) pulling details on the storage location and/or further processing of one or more materials from a database DB4, wherein said materials have the same or essentially the same identity as the sample material of step d) and/or having the same or essentially the same value for the at least one parameter as the sample material of step d),
  - f1.2) ranking the details obtained in step f1.1) with the materials having the highest similarity in terms of the material identity and in terms of the value of the at least one parameter at the top of the ranking, and
  - f1.3) displaying the details on storage details and/or further processing of the material at the top of the ranking obtained in step f1.2) on the input/output device.

In principle, the steps f1.1) and f1.2) are not subject to any limitations regarding a specific procedure for the similarity analysis. The similarity analysis of these steps can be done according to the routine of step d1c), with the exception that the query vector is based on the identity of materials, and the value(s) of parameter(s), both predicted in the preceding steps, and the database vectors are based on the identity of materials, and the value(s) of parameter(s) stored in the database DB4.

The recommendations/details on the further processing given in step f1.3) depend on the material in question and thus on the parameters being significant for that material.

For example, if the material is soy, the content of amino acids, and the PCI will be important. In case the PCI indicates over processed soy and thus the content of specific or all amino acids in the material is too low, the method would give details on the supplementation of those amino acids, whose content in the material is deficient. For example, if the material was over processed, the differential amount between the desired value and the real value for the amount of an amino acid in a feedstuff raw material and/or feedstuff can be predicted according to the technical teaching of EP 3361248 A1, in particular according to claim 8 and/or 9 of EP 3361248 A1. In a similar way, recommendations on a further processing for the material in question can be given, when the PCI predicted for the material in question indicates that it is under-processed, preferably according to the technical teaching of EP 3361248 A1, in particular according to claim 14 of EP 3361248 A1. Details on the further processing in order to compensate for an energy deficit in the material in question can be given according to the technical teaching of WO 2019/215206 A1, in particular according to claim 14 of WO 2019/215206 A1.

In practice, the material after being subjected to the method according to the present invention is further processed and/or fed to a specific storage place. It is therefore preferred that the details obtained from the material subjected to the method according to the present are also stored in the database DB4. This helps to keep the status of the database DB4 up to date.

In yet another embodiment the method according to the present invention further comprises the step
g) depositing details on the material of the sample of step d), comprising the steps of
  g1) receiving details on the storage location and/or the further processing of the material of the sample of step d) on the input/output device,
  g2) if necessary, receiving the input of an identification code or the selection from identification codes for the material of the sample of step d) on the input/output device, and
  g3) storing the details received in step g1), the material identity and the value of the at least one parameter predicted in step e), if necessary, together with the identification code received in step g2), on the input/output device.

In principle, the databases DB1, DB2, DB3 and/or DB4 can be identical or different from one another. Preferably, the databases DB2 and DB4 are identical. Further, the databases DB1, DB2, DB3 and/or DB4 can be stored independently from one another on one single device, e.g. the input/output device used in the method according to the present invention or a server or a cloud. Alternatively, it is also possible that each or all of them are stored on a separate device, which can be also a server or a cloud. In this case, the relevant information or data received on the input/output device or provided/generated by any other device, preferably a spectrometer, in the network of the method according to the present invention, is/are transferred to a server or cloud, where they are further processed, e.g. used to make the predictions, and the data thus obtained from the further processing, e.g. the predictions, are then sent to the input/output device. For example, the spectrum recorded in step d) is transferred from the spectrometer to the input/output device which further transfers it to a first server with a database DB1, or the spectrum is directly transferred to the first server, to make the similarity analysis. The same server may also host the database DB2, from which the one or more parameters, whose value(s) is/are to be predicted, are pulled. The same server may host the database DB3, from which the calibration graphs and/or calibration functions for the prediction are pulled, so that the predictions for the sample material in question can be made and displayed as result on the input/output device. Otherwise, when the databases DB2 and DB3 are hosted on other servers, the data are pulled from respective databases and the thus obtained data or information are sent to that other servers, where the predictions are made. The thus obtained predictions are then sent back to the input/output device, where they are displayed as results. The database DB4 may be on the same or a different server, wherein again the data are exchanged between the input/output device and the different server. The final data obtained in step g) are then stored in the database DB4.

In order to obtain evaluations of the best possible accuracy, it is beneficial if the spectra, which are the basis for any evaluations, are as reliable and representative as possible. It is therefore desired to subject samples, which are as homogenous as possible, to step d). Preferably, the homogenization of the sample material is caused by shaking. For example, the spectrometer which records the spectra in step d) is provided with a shaker, which is partially filled with the sample material, and then it is shaken for a time period, which is sufficient to lead to a satisfactory homogenization of the sample material.

In another embodiment the method according to the present invention therefore further comprises the step of homogenizing the sample material prior to subjecting it to step d).

The method according to the present invention can be implemented on any system comprising i) an input/output device, ii) at least one spectrometer, and iii) a processing unit. The only requirement to be met by such a system are that the input/output device, the at least one spectrometer, and the processing unit must form a network so that they can communicate and share, send and exchange data among each other, and that the processing unit must be adapted to carry out the method according to the present invention, Another object of the present invention is a system for evaluating spectra of a biological substance of animal origin, vegetable origin or a mixture thereof, comprising
  I) an input/output device,
  II) at least one spectrometer, and
  III) a processing unit adapted to carry out the method according to the present invention,
wherein the input/output device, the at least one spectrometer and the processing unit form a network.

The processing unit can be part of the input/output device or of a separate device.

Since the processing unit, an integral part of that system, is adapted to carry out the method according to the present invention, the whole system is therefore suitable or adapted for evaluating spectra.

In principle, the input/output device of the system according to the present invention is not subject to any limitation and can therefore be any conceivable input/output device that can receive input from a user or a device, such as a spectrometer, display information or data to the user and transfer information or data to a device. Said input/output device can be a computer, e.g. a desktop computer, a network computer or a portable computer, such as a laptop or a notebook, a tablet or smartphone. In the context of the present invention and, in particular, in view of the range of applications for the method according to the present invention, it is preferred that the input/output device is portable.

In principle, the at least one spectrometer of the system according to the present invention is also not subject to any limitation and can therefore be any conceivable spectrometer, such as an infrared spectrometer, near infrared spectrometer, independently from whether it is run in transmission or reflectance mode, a Raman spectrometer, a UV-Vis spectrometer or combination thereof. Further, the method according to the present invention is in principle also applicable to portable or stationary spectrometers. Nevertheless, in view of the range of applications for the method according to the present invention, it is preferred that the spectrometer is portable.

In an embodiment of the system according to the present invention, the input/output device and/or the at least one spectrometer is/are portable.

The invention claimed is:

1. A method for evaluating spectra of a biological substance of animal and/or vegetable origin, the method comprising:
   (a) detecting a spectrometer in a network formed of at least one spectrometer and an input/output device;
   (b) requesting an individual status of each spectrometer in the network of the detecting (a), and displaying the detected spectrometers and their status on the input/output device, wherein the status reflects if a spectrometer is available for recording a spectrum or not;
   (c) receiving a selection from the spectrometers being available for recording a spectrum on the input/output device;
   (d) recording a spectrum of a sample material of animal origin, vegetable origin or a mixture thereof on the spectrometer selected in the receiving (c), wherein the recording (d) further comprises (d1) predicting the identity of the sample material of the recording (d) from the spectrum recorded in the recording (d) by a similarity analysis using a database DB1 of spectra of known materials; (d2a) displaying a predicted identity of the sample material obtained in the predicting (d1) on the input/output device; and (d2b) receiving (i) a confirmation of the predicted identity displayed in the displaying (d2a) or (ii) a non-confirmation of the predicted identify displayed in the displaying (d2a) and the input of the identity of the sample material on the input/output device;
   (e) predicting a value for at least one parameter from the spectrum of the recording (d) by at least one calibration function and/or calibration graph suitable for predicting the value of the at least one parameter, the at least one parameter being (1) content of at least one amino acid, (2) crude protein content, (3) ammonia content, (4) total amino acid and ammonia content, (5) total amino acid content without ammonia, (6) crude fat content, (7) dry matter content, (8) crude ash content, (9) energy content, (10) biogenic amine content, (11) antinutritional factor content, antinutritional factor(s) being a trypsin inhibitor, a glucosinolate, a gossypol, and/or any derivative and/or salts thereof, (11) sugar content, (12) starch content, (13) crude fiber content, (14) neutral detergent fiber content, (15) acid detergent fiber content, (16) total phosphorous content, (17) phytate phosphorous content, (18) reactive lysine content, (19) total lysine content, (20) reactive lysine content to total lysine content ratio, (21) protein dispersibility index, (21) protein solubility, (22) trypsin inhibitor activity, (23) urease activity, and (24) proceeding conditions indicator (PCI); and
   (f) displaying a result from the prediction (e) on the input/output device.

2. The method of claim 1, wherein the recording (d) further comprises:
   (d3a) pulling one or more parameters whose value(s) is/are predicted in the predicting (e) for a material whose identity was predicted in the predicting (d1), confirmed in the displaying (d2a) or input in the receiving (d2b) from a database DB2.

3. The method of claim 2, wherein the recording (d) further comprises:
   (d2') proceeding with the pulling (d3a), when the identity of the sample material is predicted in the predicting (d1) with a likelihood of more than 50%.

4. The method of claim 2, wherein the database DB2 comprises info which parameters are significant for the material in question, so that only the one or more parameter being significant for the material are pulled from the database DB2 in the pulling (d3a).

5. The method of claim 2, wherein the recording (d) further comprises:
   (d3b) displaying the one or more parameters obtained from the pulling (d3a) on the input/output device; and
   (d3c) receiving a selection from the parameters displayed in displaying (d3b).

6. The method of claim 1, wherein the recording (d) is a multiple recording of spectra, further comprising:
   (i) forming the centroid of all spectra recorded in the recording (d) and subjecting the thus obtained centroid to the predicting (e); or
   (ii) predicting the values for the at least one parameter from each spectrum of the recording (d), and forming the mean value for the at least one parameter.

7. The method of claim 1, wherein the predicting (e) further comprises:
   (e1.1) pulling a calibration graph and/or calibration equation for the prediction of the value of the at least one parameter from a database DB3;
   (e1.2) reading off the value of the at least one parameter matching to the absorptions in the spectrum/spectra or the centroid of the recording (d) from the calibration graph of the pulling (e1.1) and/or inserting the absorption intensities at the respective wavelengths or wavenumbers in the spectrum/spectra or the centroid of the recording (d) into the calibration equation of the pulling (e1.1) to obtain the value for the at least one parameter; and
   (e1.3) displaying the value for the at least one parameter obtained in the reading (e1.2) as result in the displaying (f).

8. The method of claim 1, wherein the predicting (e) further comprises:
   (e2) evaluating the value predicted for the at least one parameter comprising
   (e2.1) pulling the expected value for the parameter of the sample material of the recording (d) from a database DB3,
   (e2.2) evaluating the sample material of the recording (d) as bad if the predicted value is at least a defined percentage lower than the expected value or as good if the predicted value is at least a defined percentage of the expected value, and
   (e2.3) displaying an evaluation obtained in the evaluating (e2.2) as result in the displaying (f).

9. The method of claim 1, wherein the displaying (f) further comprises:
   (f1) giving a recommendation on storage and/or further processing of the material whose sample was subjected to the recording (d), comprising (f1.1) pulling details on the storage location and/or further processing of one or more materials from a database DB4, wherein said materials have the same or essentially the same identity as the sample material of the recording (d) and/or having the same or essentially the same value for the at least one parameter as the sample material of the recording (d), (f1.2) ranking the details obtained in the pulling (f1.1) with the materials having the highest similarity in terms of the material identity and in terms of the value of the at least one parameter at the top of the ranking, and (f1.3) displaying details on storage details and/or further processing of the material at the top of the ranking obtained in the ranking (f1.2) on the input/output device.

10. The method of claim 1, further comprising:
(g) depositing details on the material of the sample of the recording (d), comprising (g1) receiving details on the storage location and/or the further processing of the material of the sample of the recording (d) on the input/output device, (g2) if necessary, receiving the input of an identification code or the selection from identification codes for the material of the sample of the recording (d) on the input/output device, and (g3) storing details received in the receiving (g1), material identity and value of the at least one parameter predicted the predicting (e), if necessary, together with the identification code received in the receiving (g2), on the input/output device.

11. The method of claim 1, further comprising:
(h) homogenizing the sample material prior to subjecting it to the recording (d).

12. A system to carry out the method of claim 1, the system comprising:
an input/output device comprising a processing unit configured to evaluate the spectrum of the sample material; and
at least one spectrometer,
wherein the input/output device and the at least one spectrometer form a network.

13. The system of claim 12, wherein the input/output device and/or the at least one spectrometer is/are portable.

* * * * *